Oct. 22, 1968   J. W. MITCHELL, JR., ET AL   3,407,280
SPOT WELD HEM JOINTS
Filed Oct. 24, 1965

JAMES W. MITCHELL, JR.
HENRY A. NIDA
INVENTORS

BY John R. Faulkner
Thomas H. Oster
ATTORNEYS

United States Patent Office 3,407,280
Patented Oct. 22, 1968

3,407,280
SPOT WELD HEM JOINTS
James W. Mitchell, Jr., Detroit, and Henry A. Nida, Dearborn, Mich., assignors to Ford Motor Company, Dearborn, Mich., a corporation of Delaware
Filed Oct. 24, 1965, Ser. No. 504,502
2 Claims. (Cl. 219—91)

ABSTRACT OF THE DISCLOSURE

The process of spot welding an outer body panel to an inner body panel without marring the surface of the outer body panel. The process comprises the steps of bending the edge of the outer body panel to form an acute angle, bending the edge of the inner panel to form a right angle, placing the bent edge of the inner body panel into the area defined by the bent edge of the outer panel and welding the two pieces together.

---

This invention is concerned with the art of assembling motor vehicle bodies and more particularly with a process for the use of spot weld hem joints for joining together the inner and outer body panels of body members such as doors, deck lids, hoods and fenders. This invention has been developed especially to permit conventional spot welding processes to be employed at such locations without marking or marring the exterior surface of the body members which are critical insofar as appearance is concerned.

Marking of the critical exterior surface of the body member is avoided by isolating the heat incident in spot welding operations away from such exterior surface. The manner in which this is accomplished is readily understood from the figures of drawing in which.

Figure 1:
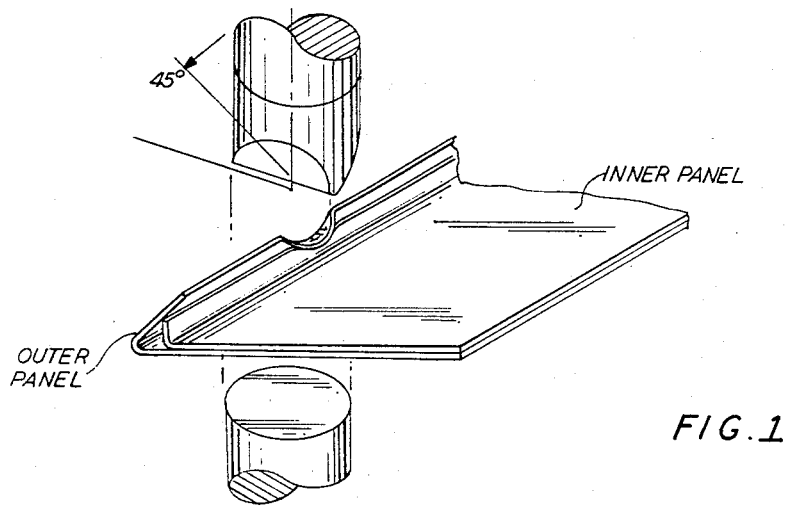
FIGURE 1 depicts one form of body member joint in which a single spot weld has been effected.
Figure 2:
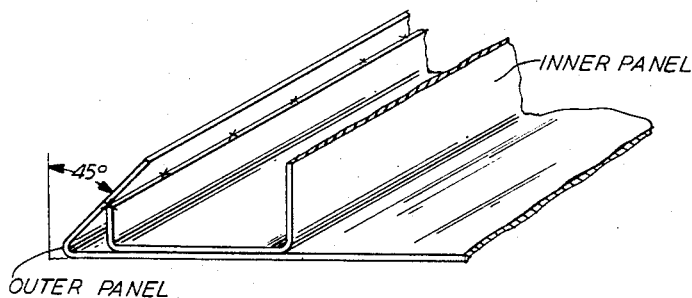
FIGURE 2 shows an alternative form of joint with the location of four prospective spot welds marked.
Figure 3:
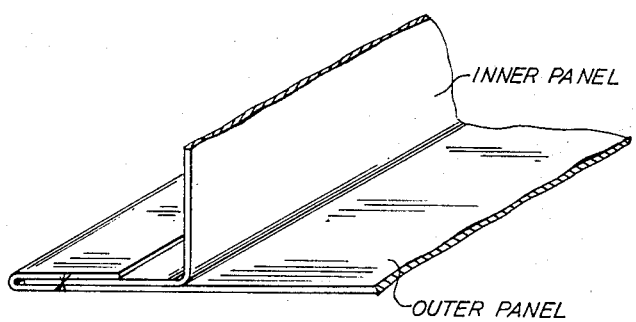
FIGURE 3 depicts the conventional form of body member joint heretofore employed.

A study of FIGURES 1 and 2 of the drawing will show that the body member joint consists of an inner panel and an outer panel. These drawings show the edge of the outer panel bent through approximately 135° so that it makes an angle of approximately 45° with the plane of the outer panel. Similarly, the edge of the inner panel is bent through approximately 90° so that it is approximately vertical to the plane of the inner panel. The inner panel and the outer panel are then assembled as shown with the bent portions in contact.

The spot welds are then made by applying pressure normal to the planes of the two panels through two opposing electrodes and then causing a spot welding current to pass through the electrodes and the joint. The electrodes are depicted in FIGURE 1. The configuration of the lower electrode is not critical provided its area and configuration serve to reduce sufficiently the pressure and current per unit of area. The upper electrode should be designed to concentrate both pressure and current into a relatively limited area. Excellent results have been attained with chisel shaped electrodes having sides arranged at an angle of 45° with its axis. The width of the working face of the electrode measured parallel to the joint as shown in FIGURE 1 is approximately 0.18 inch.

A typical joint of this type in which the outer panel is usual, automotive body stock will exhibit a bent edge of the outer panel about 0.2 inch long and a bent section of the inner panel about 0.09 inch long. The inner panel was fabricated from 0.036 inch galvanized body stock. The welding parameters were:

Electrode force _____pounds__ 284
Weld time _____cycles__ 8
Secondary current _____amperes__ 8,900

We claim as our invention:

1. The process of spot hem welding an outer body panel to an inner body panel without marring the surface of the outer body panel comprising bending up a section of the edge of the outer body panel through more than ninety degrees so that it forms an acute angle with the plane of the outer body panel, bending up a section of the edge of the inner body panel until it forms a substantial angle with the plane of the inner body panel, placing the bent up edge of the inner body panel in the area included between the outer body panel and the bent up edge of the outer body panel with the bent up edge of the inner body panel and the bent up edge of the outer body panel adjacent each other, placing the assembly so produced between a pair of spot welding electrodes capable of relative movement in a direction perpendicular to the faces of inner and of the outer body panels and aligned with the turned up edges of the inner and outer body panels and completing the spot hem weld by electrically energizing and moving towards each other the pair of spot welding electrodes whereby the adjacent edges of the inner and outer body panel members are deformed and fused together without marring the outer surface of the outer body panel.

2. The process recited in claim 1 in which the outer face of the outer body panel, the upturned edge of the outer body panel and the upturned edge of the inner body panel coact to form a structure triangular in cross section which triangular cross section rigidifies the joint both during and after the welding operation.

References Cited

UNITED STATES PATENTS 2,163,863   6/1939   Biederman _____ 219—87
2,756,312   7/1956   Watter _____ 219—91

RICHARD M. WOOD, *Primary Examiner.*

P. W. MAY, *Assistant Examiner.*